J. E. ZIMMERMANN.
SHEET METAL PULLEY.
APPLICATION FILED DEC. 30, 1903.

909,506.

Patented Jan. 12, 1909.

WITNESSES:

INVENTOR
John E. Zimmermann
BY
ATTORNEY.

UNITED STATES PATENT OFFICE.

JOHN E. ZIMMERMANN, OF WILLOW GROVE, PENNSYLVANIA, ASSIGNOR TO AMERICAN PULLEY COMPANY, A CORPORATION OF PENNSYLVANIA.

SHEET-METAL PULLEY.

No. 909,506.  Specification of Letters Patent.  Patented Jan. 12, 1909.

Application filed December 30, 1903. Serial No. 187,135.

*To all whom it may concern:*

Be it known that I, JOHN E. ZIMMERMANN, of Willow Grove, county of Montgomery, and State of Pennsylvania, have invented an Improvement in Sheet-Metal Pulleys, of which the following is a specification.

My invention has reference to sheet metal sheaves, wheels or pulleys and consists of certain improvements which are fully set forth in the following specification and shown in the accompanying drawings which form a part thereof.

The object of my invention is to provide a construction of sheet metal pulley or sheave which shall embody lightness and strength and also cheapness of construction.

My invention consists in a pulley or sheave formed of two stamped sheet metal disks or halves having their circumferential edges shaped to form the flanged rim and secured together by annular male and female overlapping and interlocking parts which are arranged immediately under the rope bearing rim and across a plane through the center of said rope bearing rim.

More specifically, my invention may be commercially practiced by forming the two halves or disks each with a concentric annular rib and groove in its opposing face, the rib on one half or disk being in alinement with the groove in the other half or disk and which when placed together engage, the ribs entering the grooves, and subsequently bending the engaged portions outward away from the center of the disks and toward the rim of the pulley whereby said engaged portions form annular male and female interlocking parts extending across and upon opposite sides of a plane through the center of the rope bearing rim.

My invention also embodies details of construction which, together with the features above specified, will be better understood by reference to the drawings, in which:—

Figure 1:
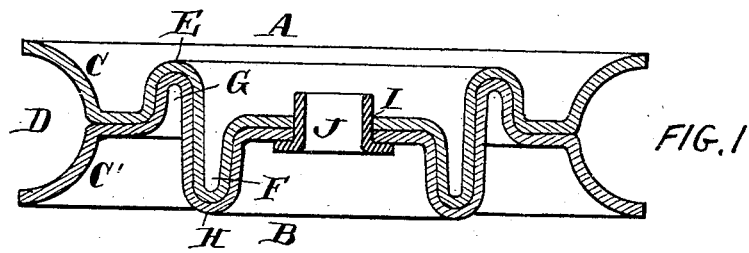
Figure 2:
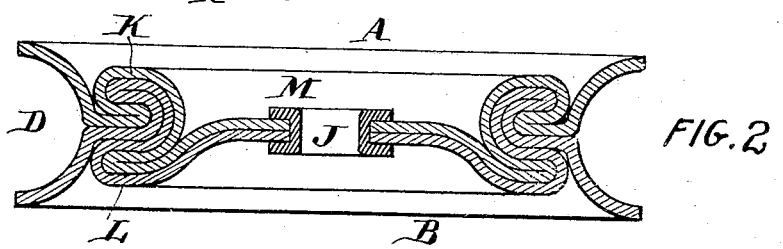
Figure 3:
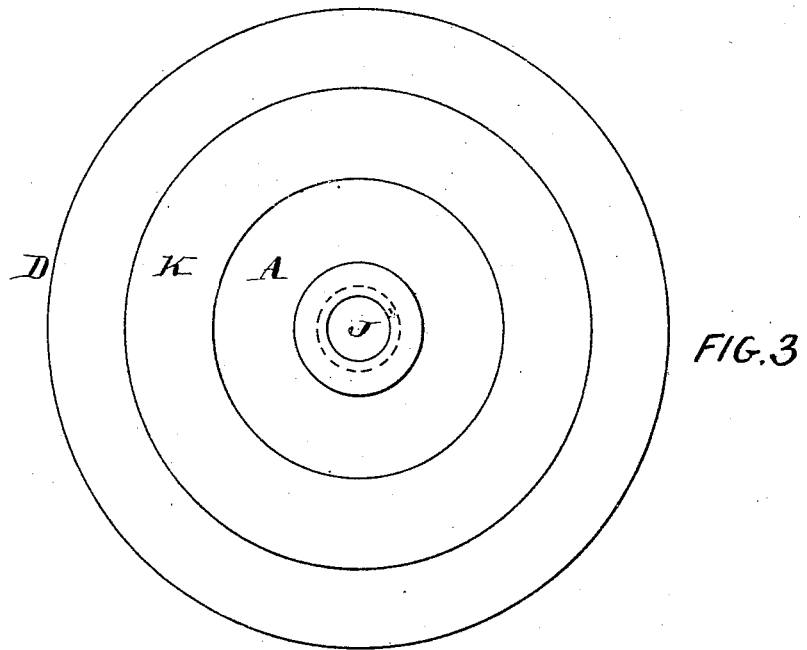

Figure 1 is a cross section through the two halves of the pulley when placed in relative position in the process of interlocking during construction; Fig. 2 is a similar section of the pulley or sheave with the parts interlocked; and Fig. 3 is a side elevation of the same.

A and B are two disks constituting the halves of the sheave or pulley. The disk A is stamped from sheet metal with the quarter curved rim C and the oppositely directed annular ribs E and F respectively projecting from opposite faces and each forming an annular groove. The disk B is likewise provided with a quarter curved rim C' and with the annular ribs G and H corresponding to the ribs E and F of the disk half A but in the inverse order; and similarly this part B is likewise provided with the grooves in the face opposite to and immediately back of the ribs. It will be seen from Fig. 1 that the thickness of the rib G must be such as capable of fitting into the groove formed in the rib E; and likewise, the rib H must be of such thickness as to form a groove capable of receiving the rib F. When the two disks or halves are placed together, the parts C C' form the grooved rim D and the annular ribs and grooves engage as shown in Fig. 1. The ribs and grooves of the two disks mutually engage when the disks are placed face to face, and when the metal of these ribbed and grooved portions of the disks is bent to the shape shown in Fig. 2, under the action of suitable dies, there is formed an interlock between the two halves or disks of the pulley which holds them together.

For the sake of clearness in indicating the bends of the interlock, the thickness of the sheet metal has been shown rather thicker than would be necessary in practice as no greater thickness would be used than that which would give the strength necessary for the particular purpose for which the pulley is to be used. The bends of the interlock K L are made as small and sharp as is consistent with the metal employed, whether it be steel, iron, brass or other ductile metal. By properly proportioning the parts of the interlocking portions these parts, indicated at K, L, are caused to fit close up under the parts C C' of the rim and directly support it as shown. This gives a very strong rim because not only is the interlock formed close up to the rim but the rim is directly sustained by the metal of the interlock at each side of the plane through the center of the rope bearing rim. It is immaterial what the diameter of the pulley or sheave may be, but in all cases the interlock is formed of the integral metal of the two halves A B and is arranged immediately adjacent to the rope bearing rim.

When considering the completed pulley, as shown in Fig. 2, the part G, together with one-half of the part H and the disk B up to the rim C', constitute the male part of the interlock and the inverse parts of the disk A namely, parts E and F, constitute the female part of the interlock; and this interlock in the complete pulley is formed of male and female overlapping and interlocking parts located centrally and partly upon opposite sides of a plane through the center of the rope bearing rim, and is extended transversely across the said plane and to some distance beyond it on each side. There is no third part necessary for forming the interlock between the halves and as the interlock is formed by the joint coaction of part of each disk or half, it is evident that the union of the two halves is by several thickness of the metal.

The belt or rope bearing rim receives the strain of the belt or rope as the case may be, and to secure the strongest effect in the pulley it is important that the interlock of the two halves of the pulley should be located centrally and immediately under said rim, so that a plane through the center of the rim will pass through the interlock, the latter extending upon opposite sides of such plane. The side faces of flanges C C' of the rim are extended laterally to substantially equal distances upon each side of the interlocking parts.

My pulley may be equally well adapted for driving by hand instead of a rope, or in fact for any other mode of driving. For band driving, the flanged parts C C' might project laterally and be shaped to give the rim a cylindrical form; or the periphery may be of any other shape adapted for other power transmitting means than cables, ropes or belts.

Any suitable hub may be employed with the pulley or sheave. In the form shown this hub is formed like a large eyelet J which is first of the shape shown in Fig. 1 and subsequently flanged as at M in Fig. 2. I do not restrict myself to any type or form of hub or manner of attaching it to the sheet metal halves.

While I prefer the construction shown, I do not confine myself to the details thereof, as they may be modified without departing from the spirit of the invention.

Having now described my invention, what I claim as new, and desire to secure by Letters Patent, is:—

1. A pulley constructed of two halves of pressed sheet metal held together by annular male and female overlapping and interlocking parts of the two halves located centrally of and immediately under the belt or rope bearing rim.

2. A pulley constructed of two halves of pressed sheet metal held together by annular male and female overlapping and interlocking parts of the two halves located centrally of and immediately under the belt or rope bearing rim, the side faces of said rim being extended laterally to substantially equal distances upon each side of the interlocking parts.

3. A pulley constructed of two halves of pressed sheet metal held together by annular male and female overlapping and interlocking parts of the two halves located partly upon opposite sides of a plane through the center of the belt or rope bearing rim, and in which said overlapping and interlocking parts are arranged immediately under the rim.

4. A pulley constructed of two halves of pressed sheet metal held together by annular male and female overlapping and interlocking parts of the two halves located partly upon opposite sides of a plane through the center of the belt or rope bearing rim, and in which said overlapping and interlocking parts are arranged immediately under the rim and in direct contact and integral connection therewith.

5. A pulley constructed of two halves of pressed sheet metal held together by continuous annular male and female overlapping and interlocking parts of the two halves extending around the center of the said halves and said overlapping and interlocking parts being each located partly upon opposite sides of a plane through the center of the belt or rope bearing rim.

In testimony of which invention, I hereunto set my hand.

JOHN E. ZIMMERMANN.

Witnesses:
M. J. EYRE,
R. M. KELLY.